United States Patent
Brand

(10) Patent No.: US 11,265,319 B2
(45) Date of Patent: *Mar. 1, 2022

(54) METHOD AND SYSTEM FOR ASSOCIATING A UNIQUE DEVICE IDENTIFIER WITH A POTENTIAL SECURITY THREAT

(71) Applicant: Entersekt International Limited, Ebene (MU)

(72) Inventor: Christiaan Johannes Petrus Brand, Stellenbosch (ZA)

(73) Assignee: Entersekt International Limited, Ebene (MU)

( * ) Notice: Subject to any disclaimer, the term of this patent is extended or adjusted under 35 U.S.C. 154(b) by 50 days.

This patent is subject to a terminal disclaimer.

(21) Appl. No.: 16/850,129

(22) Filed: Apr. 16, 2020

(65) Prior Publication Data

US 2020/0244658 A1 Jul. 30, 2020

Related U.S. Application Data

(63) Continuation of application No. 15/465,220, filed on Mar. 21, 2017, now Pat. No. 10,652,240, which is a (Continued)

(51) Int. Cl.
*H04L 29/06* (2006.01)
*H04L 9/30* (2006.01)
(Continued)

(52) U.S. Cl.
CPC ..... *H04L 63/0876* (2013.01); *G06Q 20/3278* (2013.01); *H04L 9/0863* (2013.01);
(Continued)

(58) Field of Classification Search
CPC . H04L 63/04; H04L 63/0435; H04L 63/0442; H04L 63/045; H04L 63/08;
(Continued)

(56) References Cited

U.S. PATENT DOCUMENTS 6,542,610 B2 4/2003 Traw et al.
7,929,702 B2 4/2011 Brown et al.
(Continued)

FOREIGN PATENT DOCUMENTS

WO 2005015819 A1 2/2005
WO 2005107140 A1 11/2005

OTHER PUBLICATIONS

Dierks et al., "The Transport Layer Security (TLS) Protocol", RFC 5246, Aug. 2008.

*Primary Examiner* — Kristine L Kincaid
*Assistant Examiner* — Shaqueal D Wade-Wright
(74) *Attorney, Agent, or Firm* — The Webb Law Firm

(57) ABSTRACT

A method and system for associating a unique device identifier with a potential security threat are described. In a method conducted at a remotely accessible server, a unique device identifier is received from a computing device. The unique device identifier is associated with a record and is usable in identifying the computing device. An interaction data element is received from the computing device. The received interaction data element is validated including confirming that the received interaction data element matches an expected interaction data element associated with the record. Based on determining that the received interaction data element is not valid, the record is updated to associate the unique device identifier with a potential security threat. The interaction data element is updated periodically according to a sequence. The expected interaction data element changes based on the sequence.

20 Claims, 8 Drawing Sheets

Related U.S. Application Data continuation-in-part of application No. 14/289,692, filed on May 29, 2014, now abandoned.

(51) Int. Cl.

| | | |
|---|---|---|
| *H04L 9/32* | (2006.01) | |
| *H04W 12/12* | (2021.01) | |
| *H04L 9/08* | (2006.01) | |
| *H04W 12/06* | (2021.01) | |
| *G06Q 20/32* | (2012.01) | |
| *H04W 12/50* | (2021.01) | |

(52) U.S. Cl.
CPC .............. *H04L 9/30* (2013.01); *H04L 9/3263* (2013.01); *H04L 9/3268* (2013.01); *H04L 63/0435* (2013.01); *H04L 63/0442* (2013.01); *H04L 63/0823* (2013.01); *H04L 63/1466* (2013.01); *H04L 63/18* (2013.01); *H04W 12/06* (2013.01); *H04W 12/12* (2013.01); *H04W 12/50* (2021.01); *G06F 2221/2103* (2013.01)

(58) Field of Classification Search
CPC . H04L 63/0823; H04L 63/0876; H04L 63/14; H04L 63/1433; H04L 63/1466; H04L 63/1416; H04L 9/08; H04L 9/0863; H04L 9/0891; H04W 12/04; H04W 12/06; H04W 12/12
See application file for complete search history.

(56) References Cited

U.S. PATENT DOCUMENTS

| | | |
|---|---|---|
| 8,582,773 B2 | 11/2013 | Zhang et al. |
| 2005/0031126 A1 | 2/2005 | Edney et al. |
| 2005/0278542 A1 | 12/2005 | Pierson et al. |
| 2008/0215883 A1 | 9/2008 | Fok et al. |
| 2012/0150750 A1 | 6/2012 | Law et al. |
| 2013/0132717 A1* | 5/2013 | Brand ................... H04L 9/3247 713/156 |
| 2013/0294602 A1 | 11/2013 | Huxham et al. |
| 2013/0318139 A1 | 11/2013 | Park et al. |
| 2014/0310532 A1 | 10/2014 | Ali et al. |
| 2014/0258392 A1 | 11/2014 | Barth et al. |
| 2015/0302217 A1* | 10/2015 | Liu ....................... G06F 21/316 726/30 |
| 2015/0326547 A1 | 11/2015 | Carlson |
| 2015/0341785 A1 | 11/2015 | Young et al. |
| 2020/0137058 A1* | 4/2020 | Allen .................. H04L 63/0442 |

* cited by examiner

METHOD AND SYSTEM FOR ASSOCIATING A UNIQUE DEVICE IDENTIFIER WITH A POTENTIAL SECURITY THREAT

CROSS-REFERENCES TO RELATED APPLICATIONS

This application is a continuation of U.S. application Ser. No. 15/465,220, filed on Mar. 21, 2017, which is the continuation-in-part of U.S. application Ser. No. 14/289,692, filed on May 29, 2014, the disclosures of which are hereby incorporated by reference in their entireties.

FIELD OF THE DISCLOSURE

This disclosure relates to methods and systems for secure communications, and, more particularly, to a method and system for establishing a secure communication channel between a mobile handset and a remotely accessible server.

BACKGROUND TO THE DISCLOSURE

It is often desirable to establish a secure communication channel between two communicating parties, particularly in cases where sensitive data is to be transmitted between the parties. Many systems exist wherein a secure communication channel is required between a mobile handset and a remotely accessible server, such as an application server, so as to ensure that data communicated between the parties are transmitted in a manner that is end-to-end secure.

In the remainder of this specification the term "mobile handset" should be interpreted to include any mobile communications device capable of communicating over a communications network, such as a cellular network, and having at least a limited amount of processing power. The term should be interpreted to specifically include all mobile or cellular phones but may also include portable computers such as laptops, handheld personal computers and the like.

An increasing number of financial transactions are initiated, conducted and/or authorized using mobile handsets. Accordingly, secure communication channels are often required when sensitive data relating to such financial transactions are to be transmitted to and from the mobile handset.

Miscreants are constantly developing new techniques to intercept user and transactional data and to use these for defrauding one or more parties involved. Examples of security threats include Man-In-The-Middle (MITM) attacks, Pharming, Phishing, Over-The-Air SMS/data sniffing, third party infrastructure hijacking, Trojans, key loggers as well as various combinations of these and other threats. Using these and other methods, sensitive data such as financial information or encryption keys associated with a user or the mobile handset of the user may be obtained and used for fraudulent purposes.

A known method used in an attempt to alleviate the problems described above, is the generation of credentials having a limited validity, typically for a single use. For example, a single-use encryption key or password may be generated for securing a communication channel between a mobile handset and a remotely accessible server.

The mobile handset may be required to produce the appropriate key or password using information contained in a challenge from the remotely accessible server. For example, the remotely accessible server may transmit a challenge that includes a seed value to the mobile handset. The mobile handset uses the seed value and an incremental counter value to generate a single-use key or password for a particular communication, which can be verified by the remotely accessible server.

A problem associated with this method of securing a communication channel is that it may involve both the mobile handset and the remotely accessible server being required to possess the seed value and/or the counter value at some stage. If the mobile handset is compromised, these values may be obtained and fraudulently used, as described above.

Methods exist whereby keys or other sensitive data such as a seed and/or counter value are encrypted with a passcode and stored on the mobile handset in an encrypted format. However, the encrypted data may not be securely stored, and it may be possible that the passcode is obtained, for example by way of an exhaustive search, in order to decrypt and obtain the keys or other sensitive data.

Embodiments of the present disclosure aim to address these and other problems, at least to some extent.

SUMMARY OF THE DISCLOSURE

In accordance with an aspect of the disclosure there is provided a method conducted at a remotely accessible server comprising: receiving a unique device identifier from a computing device, wherein the unique device identifier is associated with a record and is usable in identifying the computing device; receiving an interaction data element from the computing device; validating the received interaction data element including confirming that the received interaction data element matches an expected interaction data element associated with the record; and, based on determining that the received interaction data element is not valid, updating the record to associate the unique device identifier with a potential security threat, wherein the interaction data element is updated periodically according to a sequence, and wherein the expected interaction data element changes based on the sequence.

The record may be accessible to the remotely accessible server and may comprise a subset of previously used interaction data elements; the interaction data element may be updated periodically at the computing device according to a sequence maintained at the remotely accessible server; confirming that the received interaction data element matches an expected interaction data element may include identifying a matching interaction data element in a list of interaction data elements stored in association with the record; the method may include updating the interaction data element according to the sequence when the received interaction data element is valid, including: obtaining a newly generated interaction data element; updating a list of interaction data elements to include the newly generated interaction data element; and, transmitting the newly generated interaction data element to the computing device for subsequent presentation to the remotely accessible server; updating the list of interaction data elements may include removing one or more previously used interaction data elements from the list; the expected interaction data element may change based on an updated list of interaction data elements.

The method may include an initialization process including: obtaining an initial interaction data element; initializing a list of previously used interaction data elements including the initial interaction data element; and, transmitting the initial interaction data element to the computing device for subsequent presentation to the remotely accessible server.

The method may include: permitting communications with the computing device to continue based on determining that the interaction data element is not valid; or, terminating communications with the computing device based on determining that the interaction data element is not valid.

Associating the unique device identifier with a potential security threat may include blacklisting the unique device identifier, wherein blacklisting the unique device identifier prevents communications with any computing device that presents the unique device identifier to the remotely accessible server; associating the unique device identifier with a potential security threat may include initiating an out of band authentication request.

The unique device identifier may be a digital user certificate including an identifier which is uniquely associated with the computing device; the method may include: validating an origin of the digital user certificate, the digital user certificate having been issued to the computing device by a certificate authority and including a computing device public key and the identifier uniquely associated with the computing device; and transmitting a digital server certificate to the computing device for validation of the remotely accessible server, the digital server certificate having been issued to the remotely accessible server by the certificate authority and including a server public key corresponding to a server private key.

The interaction data element may be received as a part of or subsequent to establishment of a secure communication channel between the computing device and the remotely accessible server, and wherein the method includes transmitting a newly generated interaction data element to the computing device for storage and presentation to the remotely accessible server as a part of or subsequent to establishment of a subsequent secure communication channel.

The interaction data element may be received in response to establishment of a secure communication channel between the computing device and the remotely accessible server, wherein as a part of establishing the secure communication channel the computing device provides the unique device identifier to assert an association with a registered user, and wherein the interaction data element is transmitted and received via the secure communication channel.

The interaction data element may be received in the form of a challenge-response in which a challenge transmitted to the computing device is received from the computing device in the form of a response including the challenge having been signed at the computing device using the interaction data element, wherein validating the received interaction data element includes validating the challenge-response.

Receiving the interaction data element may include receiving data having been symmetrically encrypted by the computing device using the interaction data element as a symmetric encryption key, wherein validating the received interaction data element includes attempting to decrypt the symmetrically encrypted data using the expected interaction data element.

The expected interaction data element may be a most recently used interaction data element stored in a list of previously used interaction data elements, and wherein the interaction data element is not valid where an interaction data element other than the most recently used interaction data element or a predetermined sequence of interaction data elements used prior to the most recently used interaction data element was used to encrypt data received from the computing device.

The interaction data element may be deterministic and wherein the method includes obtaining an initial or newly generated interaction data element using a static seed value and a counter value, one or both of which is uniquely associated with the unique device identifier, and an algorithm.

The interaction data element may be a random number, wherein the method includes obtaining an initial or newly generated interaction data element using randomness collected from one or more hardware sources associated with the remotely accessible server, and wherein obtaining an initial or newly generated interaction data element uses a hardware security module.

Web services may be accessible by the computing device from the remotely accessible server via a communications interface.

In accordance with a further aspect of the disclosure there is provided a system including a remotely accessible server including memory for storing computer-readable program code and a processor for executing the computer-readable program code, the remotely accessible server comprising: a device identifier receiving component for receiving a unique device identifier from a computing device, wherein the unique device identifier is associated with a record and is usable in identifying the computing device; an interaction data element receiving component for receiving an interaction data element from the computing device; an interaction data element validating component for validating the received interaction data element including confirming that the received interaction data element matches an expected interaction data element associated with the record; and, a threat association component for, based on determining that the received interaction data element is not valid, updating the record to associate the unique device identifier with a potential security threat, wherein the interaction data element is updated periodically according to a sequence, and wherein the expected interaction data element changes based on the sequence.

In accordance with a further aspect of the disclosure there is provided a computer program product comprising a non-transitory computer-readable medium having stored computer-readable program code for performing the steps of: receiving a unique device identifier from a computing device, wherein the unique device identifier is associated with a record and is usable in identifying the computing device; receiving an interaction data element from the computing device; validating the received interaction data element including confirming that the received interaction data element matches an expected interaction data element associated with the record; and based on determining that the received interaction data element is not valid, updating the record to associate the unique device identifier with a potential security threat, wherein the interaction data element is updated periodically according to a sequence, and wherein the expected interaction data element changes based on the sequence.

In accordance with a further aspect of the disclosure there is provided a method for determining a compromise risk associated with a unique device identifier the method being conducted at a remotely accessible server and comprising: receiving an interaction data element from a mobile handset, the mobile handset having provided a unique device identifier usable in identifying the mobile handset; validating the received interaction data element against a record associated with the unique device identifier including identifying the received interaction data element in a list including a subset of previously used interaction data elements; if the received interaction data element is valid: obtaining a newly generated interaction data element; updating the list of previously used interaction data elements to include the newly generated interaction data element; and, transmitting the newly generated interaction data element to the mobile handset for subsequent presentation to the remotely accessible server; or, if the received interaction data element is not valid, associating the unique device identifier with a potential security threat.

In accordance with a further aspect of the disclosure there is provided a system for determining a compromise risk associated with a unique device identifier, the system including a remotely accessible server including memory for storing computer-readable program code and a processor for executing the computer-readable program code, the remotely accessible server comprising: an interaction data element receiving component for receiving an interaction data element from a mobile handset, the mobile handset having provided a unique device identifier usable in identifying the mobile handset; an interaction data element validating component for validating the received interaction data element against a record associated with the unique device identifier including identifying the received interaction data element in a list including a subset of previously used interaction data elements; an interaction data element updating component for, if the received interaction data element is valid: obtaining a newly generated interaction data element; updating the list of previously used interaction data elements to include the newly generated interaction data element; and, transmitting the newly generated interaction data element to the mobile handset for subsequent presentation to the remotely accessible server; and, a threat association component for, if the received interaction data element is not valid, associating the unique device identifier with a potential security threat.

In accordance with a further aspect of the disclosure there is provided a computer program product for determining a compromise risk associated with a unique device identifier, the computer program product comprising a computer-readable medium having stored computer-readable program code for performing, at a remotely accessible server, the steps of: receiving an interaction data element from a mobile handset, the mobile handset having provided a unique device identifier usable in identifying the mobile handset; validating the received interaction data element against a record associated with the unique device identifier including identifying the received interaction data element in a list including a subset of previously used interaction data elements; if the received interaction data element is valid: obtaining a newly generated interaction data element; updating the list of previously used interaction data elements to include the newly generated interaction data element; and, transmitting the newly generated interaction data element to the mobile handset for subsequent presentation to the remotely accessible server; or, if the received interaction data element is not valid, associating the unique device identifier with a potential security threat.

In accordance with a further aspect of the disclosure there is provided a method of establishing a secure communication channel between a mobile handset and a remotely accessible server, the method being carried out at the remotely accessible server and comprising the steps of: deterministically updating a used counter value to yield an updated counter value, the used counter value having been used to generate a previously used symmetric key for encrypting communications between the remotely accessible server and the mobile handset; storing the updated counter value; using the updated counter value to generate a symmetric key; generating a key transfer message including the symmetric key generated using the updated counter value; asymmetrically encrypting the key transfer message using a handset public key associated with the mobile handset; transmitting the key transfer message to the mobile handset such that the mobile handset is capable of using a handset private key corresponding to the handset public key to decrypt the key transfer message and obtain the symmetric key; decrypting further data received from the mobile handset asymmetrically using a server private key associated with the remotely accessible server and symmetrically using the symmetric key; and encrypting further data communicated to the mobile handset symmetrically using the symmetric key and asymmetrically using the handset public key.

Further features provide for the step of deterministically updating the used counter value to be triggered by one or both of a mobile handset initiation event and a server initiation event; for the symmetric key generated using the updated counter value to be used for encryption and decryption of further data until a mobile handset initiation event or server initiation event occurs; for the mobile handset initiation event or the server initiation event to include an asymmetric cryptographic operation performed on data communicated between the remotely accessible server and the mobile handset; alternatively, for the mobile handset initiation event to include any communication transmitted from the mobile handset to the remotely accessible server; and for the server initiation event to include any communication transmitted from the remotely accessible server to the mobile handset.

Yet further features provide for the mobile handset initiation event to include one or more of: receiving a communication from the mobile handset which is encrypted asymmetrically using the server public key, receiving a communication from the mobile handset which is digitally signed using the handset private key, and receiving a communication from the mobile handset which is encrypted symmetrically using the previously used symmetric key; and for the server initiation event to include one or more of: one or more handshake steps between the remotely accessible server and the mobile handset, transmitting a communication to the mobile handset which is encrypted asymmetrically using the handset public key, and transmitting a communication to the mobile handset which is encrypted symmetrically using the previously used symmetric key.

Still further features provide for the used counter value to have been used together with a static seed value to generate the previously used symmetric key; for the step of using the updated counter value to generate a symmetric key to include using the updated counter value together with the static seed value; and for the step of deterministically updating the used counter value to be preceded by one or more handshake steps carried out between the remotely accessible server and the mobile handset.

Further features provide for the one or more handshake steps to include one or both of: receiving a digital user certificate from the mobile handset using a server software application installed on the remotely accessible server and validating the digital user certificate by utilizing functionality provided by an encryption module distributed by a certificate authority, the digital user certificate having been issued to the mobile handset by the certificate authority and including the handset public key and an identifier uniquely associated with the mobile handset; and transmitting a digital server certificate to the mobile handset for validation of the remotely accessible server, validation of the digital server certificate being conducted using a handset software application installed on the mobile handset utilizing functionality provided by an encryption module provided by the certificate authority, the digital server certificate having been issued to the remotely accessible server by the certificate authority and including the server public key corresponding to the server private key.

Yet features provide for the key transfer message to be an acknowledgement message transmitted to the mobile handset in response to a mobile handset initiation event; alternatively, for the key transfer message to be transmitted to the mobile handset as part of an asymmetrically encrypted payload; and for the method to include the step of: if symmetric decryption of further data using the symmetric key is unsuccessful, attempting to decrypt the further data using the previously used symmetric key generated using the used counter value instead of using the symmetric key generated using the updated counter value, thereby accounting for the possibility of the key transfer message not being successfully transmitted to or obtained at the mobile handset.

A further feature provides for the method to include the step of: in response to determining that the previously used symmetric key or a symmetric key used or generated prior to the previously used symmetric key was used to encrypt data received from the mobile handset instead of using the symmetric key generated using the updated counter value, associating the mobile handset with a potential security threat.

Further features provide for one or both of the static seed value and the counter value to be unknown to the mobile handset; for the symmetric key to be generated using a one-time password algorithm, wherein the counter value and the static seed value are respectively used as a counter and a key in the algorithm; and for the one-time password algorithm to be Initiative For Open Authentication (OATH) HOTP.

In accordance with a further aspect of the disclosure there is provided a system for establishing a secure communication channel between a mobile handset and a remotely accessible server, the system comprising: a handset software application configured to be installed on a mobile handset to receive a key transfer message and asymmetrically decrypt the key transfer message to obtain a symmetric key therefrom, the mobile handset having associated therewith a handset public key and a corresponding handset private key; and a remotely accessible server including: an asymmetric cryptographic component for performing asymmetric encryption and decryption; a symmetric cryptographic component for performing symmetric encryption and decryption; a counter updating component for deterministically updating a used counter value to yield an updated counter value, the used counter value having been used to generate a previously used symmetric key for encrypting communications between the remotely accessible server and the mobile handset; a storing component for storing the updated counter value; a key generating component for using the updated counter value to generate a symmetric key; a message generating component for generating a key transfer message including the symmetric key generated using the updated counter value; a data transmitting component for transmitting data to the mobile handset; and a data receiving component for receiving data from the mobile handset, wherein the remotely accessible server is configured to: asymmetrically encrypt the key transfer message using the handset public key; transmit the key transfer message to the mobile handset such that the mobile handset is capable of using the handset private key corresponding to the handset public key to decrypt the key transfer message and obtain the symmetric key; decrypt further data received from the mobile handset asymmetrically using a server private key associated with the remotely accessible server and symmetrically using the symmetric key; and encrypt further data communicated to the mobile handset symmetrically using the symmetric key and asymmetrically using the handset public key.

Further features provide for the remotely accessible server to further include a triggering component for triggering deterministic updating of a used counter value; and for deterministic updating of a used counter value to be triggered by one or both of a mobile handset initiation event and a server initiation event.

A yet further feature provides for the handset software application to include a server validation component for validating a digital server certificate transmitted from the remotely accessible server to the mobile handset, validation of the digital server certificate being conducted utilizing functionality provided by an encryption module provided by a certificate authority, the digital server certificate having been issued to the remotely accessible server by the certificate authority and including the server public key corresponding to the server private key.

A still further feature provides for the remotely accessible server to include a handset validation component for validating a digital user certificate transmitted from the mobile handset to the remotely accessible server, validation of the digital user certificate being conducted utilizing functionality provided by an encryption module distributed by a certificate authority, the digital user certificate having been issued to the mobile handset by the certificate authority and including the handset public key and an identifier uniquely associated with the mobile handset.

In accordance with a further aspect of the disclosure there is provided a computer program product for establishing a secure communication channel between a mobile handset and a remotely accessible server, the computer program product comprising a computer-readable medium having stored computer-readable program code for performing the steps of: deterministically updating a used counter value to yield an updated counter value, the used counter value having been used to generate a previously used symmetric key for encrypting communications between the remotely accessible server and the mobile handset; storing the updated counter value; using the updated counter value to generate a symmetric key; generating a key transfer message including the symmetric key generated using the updated counter value; asymmetrically encrypting the key transfer message using a handset public key associated with the mobile handset; transmitting the key transfer message to the mobile handset such that the mobile handset is capable of using a handset private key corresponding to the handset public key to decrypt the key transfer message and obtain the symmetric key; decrypting further data received from the mobile handset asymmetrically using a server private key associated with the remotely accessible server and symmetrically using the symmetric key; and encrypting further data communicated to the mobile handset symmetrically using the symmetric key and asymmetrically using the handset public key, wherein the computer-readable medium is a non-transitory computer-readable medium, the computer-readable program code being executable by a processing circuit.

In order for the disclosure to be more fully understood, implementations thereof will now be described with reference to the accompanying drawings.

DETAILED DESCRIPTION WITH REFERENCE TO THE DRAWINGS

Figure 1A:
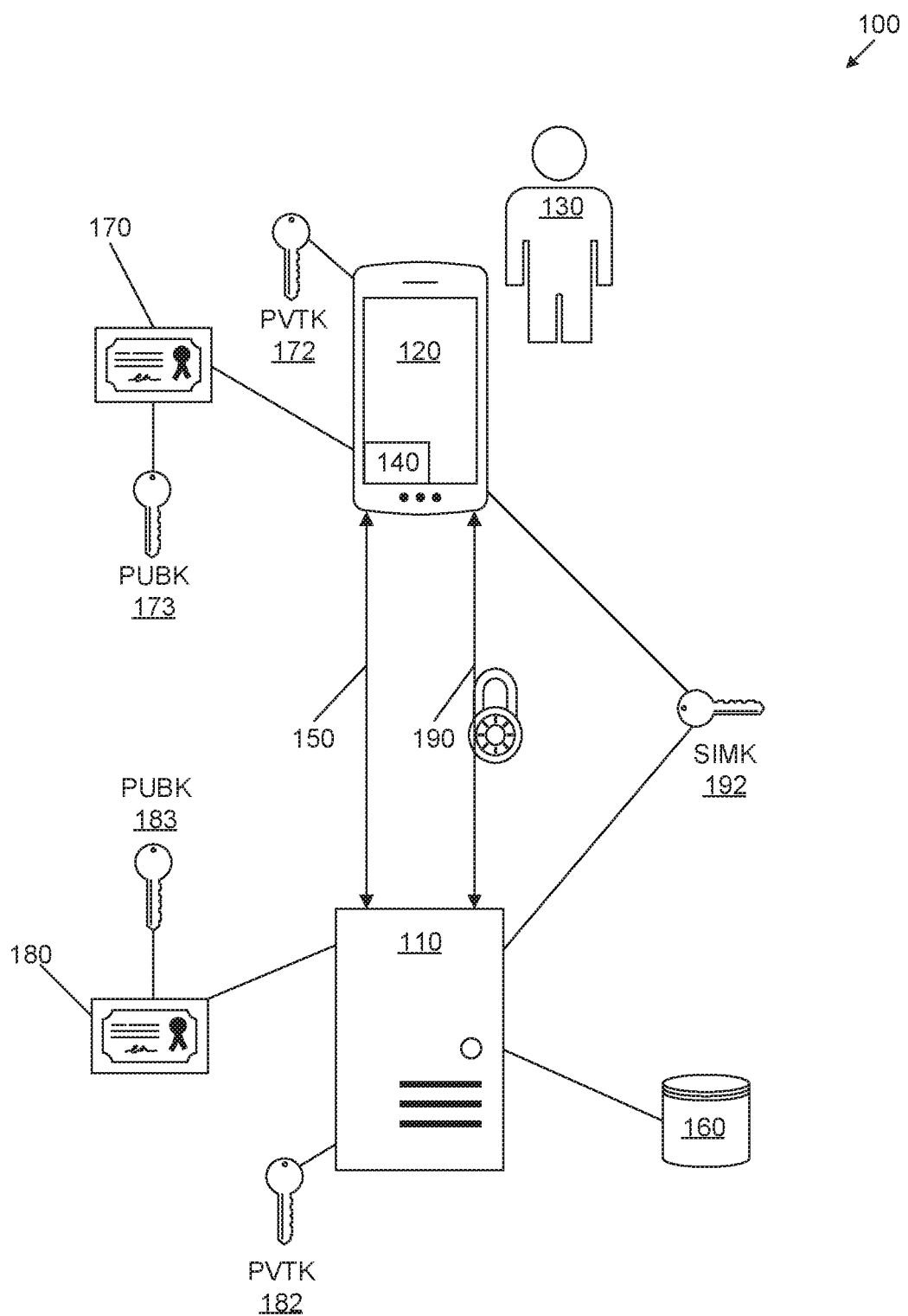
FIG. 1A is a schematic illustration of an exemplary system for establishing a secure communication channel between a mobile handset and a remotely accessible server.

An exemplary system (100) for establishing a secure communication channel is illustrated in FIG. 1A. The system (100) comprises a remotely accessible server (110) and a mobile handset (120) of a user (130). The mobile handset (120) has a handset software application (140) installed thereon. In this embodiment, the remotely accessible server (110) is an application server and the mobile handset (120) is a mobile phone.

The remotely accessible server (110) and mobile handset (120) are able to communicate over a communication channel (150). The remotely accessible server (110) has or is linked to a database (160) on which details relating to the mobile handset (120) and/or the user (130) may be stored. The database (160) may store a record associated with each registered user (or client). One or more of the following may be stored in association with each record: a unique device identifier of the user's registered mobile handset; a list including a subset of previously used interaction data elements (e.g. a predetermined sequence of previously used interaction data elements) and/or associated data (e.g. information usable in generating the interaction data elements, such as a seed value and counter value).

An encryption module may be provided by a certificate authority (not shown) which provides encryption functionality to the remotely accessible server (110) and/or the mobile handset (120). It should be apparent that the encryption modules may be compiled as part of the handset software application (140) and a server software application resident on the remotely accessible server (110), respectively. Where in the remainder of this description reference is made to functionality of either the server software application or the handset software application (140) it will be appreciated that such functionality may in effect be provided by the encryption module at the server or the mobile handset or vice versa.

The certificate authority may be managed or provided by the same entity managing or providing the remotely accessible server (110), or may be an independent or external certificate authority.

In this embodiment, both the remotely accessible server (110) and the mobile handset (120) have been provided with a digital certificate by the certificate authority. The mobile handset has a digital user certificate (170), while the remotely accessible server (110) has a digital server certificate (180), as shown in FIG. 1A.

A user private (172) and public (173) cryptographic key pair is associated with the mobile handset (120), and a server private (182) and public (183) cryptographic key pair is associated with the remotely accessible server (110).

Figure 1B:
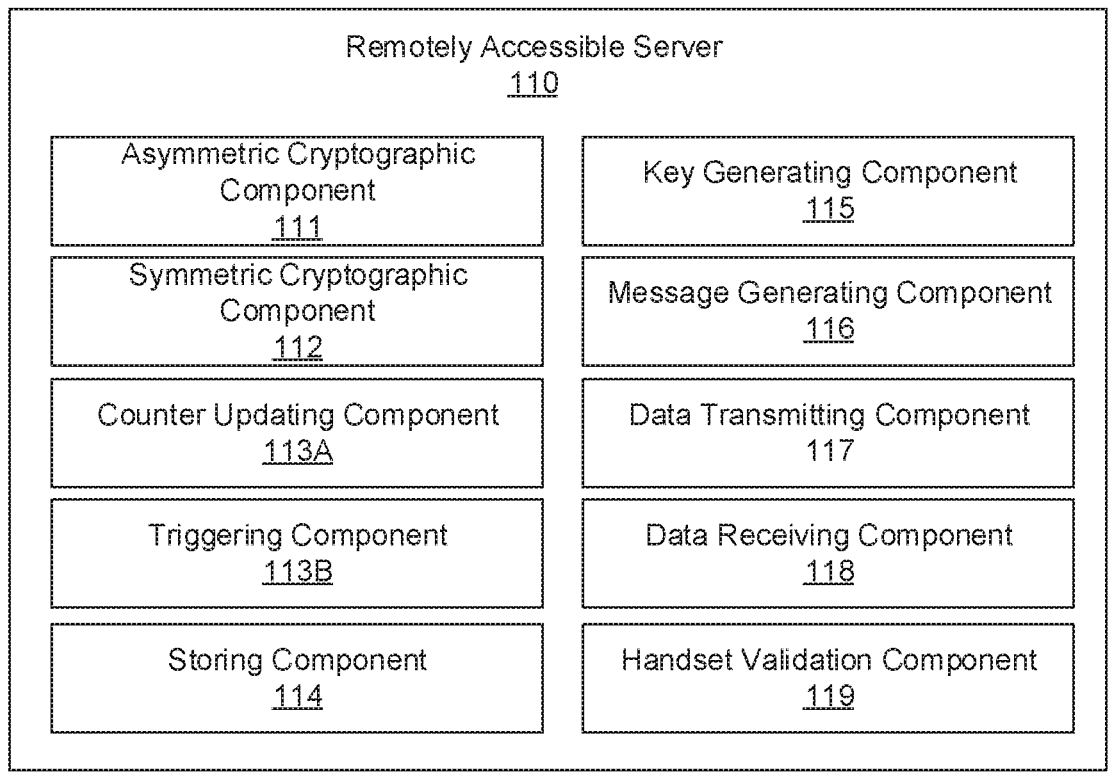
FIG. 1B is a block diagram illustrating exemplary components of a remotely accessible server.

As shown in FIG. 1B, an embodiment of the remotely accessible server (110) may include one or more of an asymmetric cryptographic component (111) for performing asymmetric encryption and decryption, a symmetric cryptographic component (112) for performing symmetric encryption and decryption, a counter updating component (113A), a triggering component (113B), a storing component (114), a key generating component (115), a message generating component (116), a data transmitting component (117), a data receiving component (118), and a handset validation component (119).

Figure 1C:
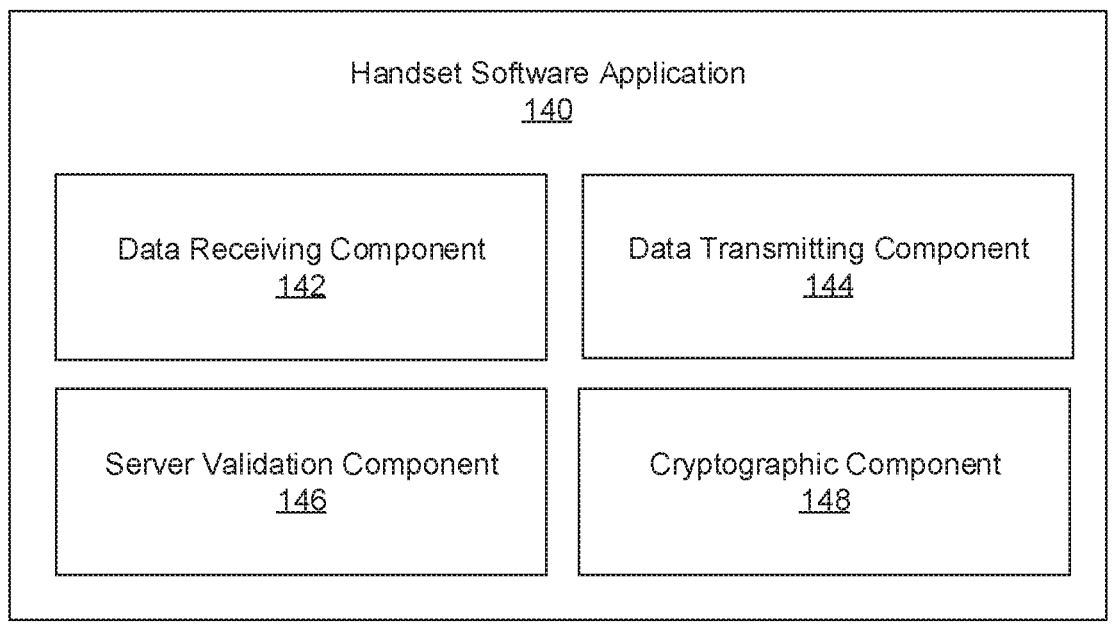
FIG. 1C is a block diagram illustrating components of an exemplary handset software application.

As illustrated in FIG. 1C, an embodiment of the handset software application (140) may include one or more of a data receiving component (142), a data transmitting component (144), a server validation component (146), and a cryptographic component (148) for performing asymmetric and/or symmetric encryption and decryption.

The user key pair (172, 173) may be calculated by the certificate authority and provided to the mobile handset (120). This will mainly happen in cases where the handset (120) itself does not have enough processing power to calculate the key pair itself. The user key pair (172, 173) may also be calculated at the handset (120) itself.

The user private key (172) may typically be sent to the mobile handset (120) over a secure channel, while the associated user public key (173) may be included in the digital user certificate (170) and be transmitted to the handset (120) separately. In some embodiments, after a key pair is generated, either by the mobile handset (120) or at a remote entity which transmits the key pair to the mobile handset (120), a certificate signing request is transmitted to the certificate authority for signature.

Figure 1D:
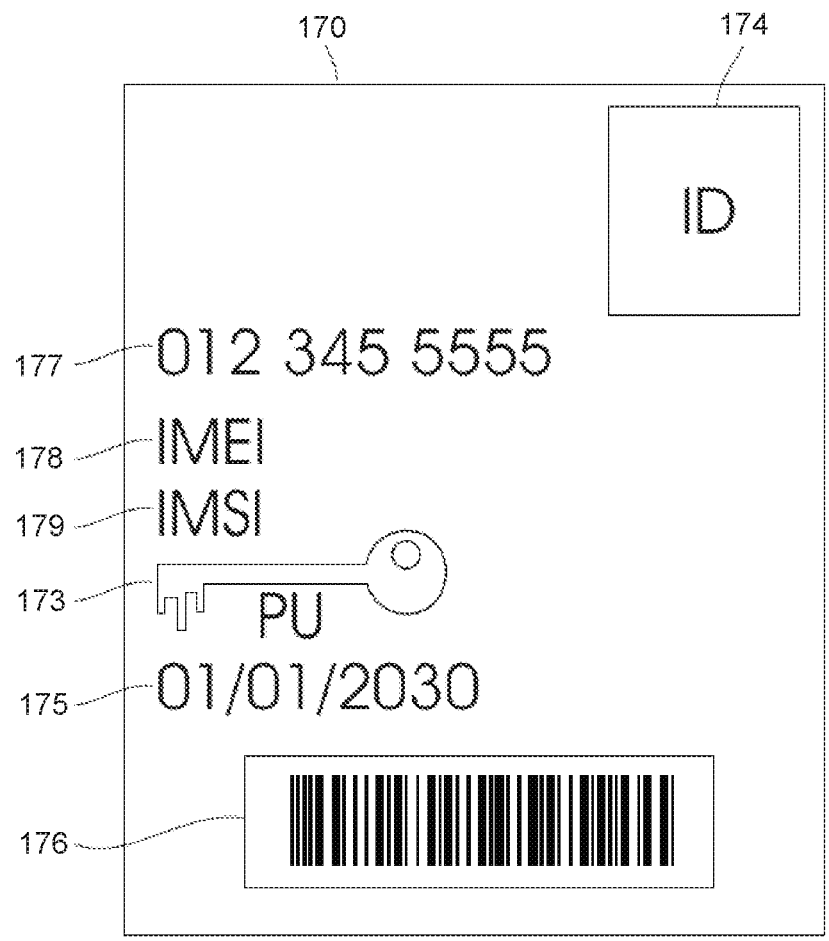
FIG. 1D illustrates an exemplary digital certificate that may be used in embodiments described herein.

An exemplary digital user certificate (170) is illustrated in FIG. 1D. In addition to the user public key (173) and a certificate authority signature (176), the certificate (170) may also contain an identifier (174) which is uniquely associated with the mobile handset (120). The identifier (174) may be any unique key which is issued by the certificate authority. The identifier (174) may be a sequential number generated by the certificate authority. It should be appreciated that due to the sequential nature of the identifier (174), a one-to-one relationship exists between each certificate issued by the certificate authority and a mobile handset. In addition to the above, the certificate (170) may also include other information such as, for example, a mobile phone number (177) associated with a Subscriber Identity Module (SIM) card of the handset (120), the handset's International Mobile Station Equipment Identity (IMEI)

(178) and/or International Mobile Subscriber Identity (IMSI) (179) numbers as well as a certificate expiry date (175).

The format of the digital server certificate (180) may be similar to that of the digital user certificate (170) and includes the server public key (183). The corresponding server private key (182) is typically saved in a secure location in the remotely accessible server (110).

Each time the mobile handset (120) and the remotely accessible server (110) initiate communications between them, it will start a certificate exchange process, whereby the digital user certificate (170) is sent to the server (110), and the digital server certificate (180) is sent to the handset (120). Both parties will then validate the content of the received certificates (170, 180), and the digital signature, to make sure that the details in the certificates (170, 180) was not tampered with. This validation may be done by using a certificate authority digital certificate that is part of both the handset software application (140) and server application or the respective encryption modules. Knowledge of the certificate authority public key may, however, be sufficient to enable validation of the respective certificates to be conducted. It should be appreciated that the certificate authority digital certificate may include the certificate authority public key and that the user and server-side applications will therefore use the certificate authority public key to decrypt the signed certificates (170, 180). If the certificates are not capable of being decrypted with the certificate authority public key, it will be apparent that they were not signed with the certificate authority private key, and are accordingly not authentic.

At this point, both parties can be sure they are talking to the intended recipients. It should be appreciated that, after the certificate exchange, the handset (120) will be in possession of the server public key (183) and the remotely accessible server (110) will be in possession of the handset public key (173).

The handset identifier (174) included in the digital user certificate (170) may also be used by the remotely accessible server (110) to uniquely identify the handset (120) and, accordingly, the user. The database (160) may include all the identifiers issued to clients, and the remotely accessible server (110) may choose to only communicate with handsets included in the database.

The digital user certificate (170) is therefore used not only to authenticate the communication channel (150) between the handset (120) and the remotely accessible server (110), but also to uniquely identify the handset (120) that is attempting to communicate with the remotely accessible server (110).

It should be appreciated that the handset software application (140) may also validate that the server (110) is the rightful owner of the certificate it sent, simply by virtue of the fact that the handset software application (140) is capable of decrypting communication sent to it by the server (110). Only communications encrypted with the server private key (182) will be capable of being decrypted with the server public key (183).

The remotely accessible server (110) further stores, in association with an identifier of the user (130) and/or the handset (120), a counter value and a static seed value. These values may typically be stored in the database (160).

It being accepted of course that appropriate measures will be taken to protect the database and prevent unauthorised access to it.

The system (100) described above with reference to FIGS. 1A to 1D is usable in a method of establishing a secure communication channel (190) between the mobile handset (120) and the remotely accessible server (110) over which data is both asymmetrically encrypted using the user and server key pairs and symmetrically encrypted using a dynamic symmetric key (192), which will be described in greater detail below.

Figure 2:
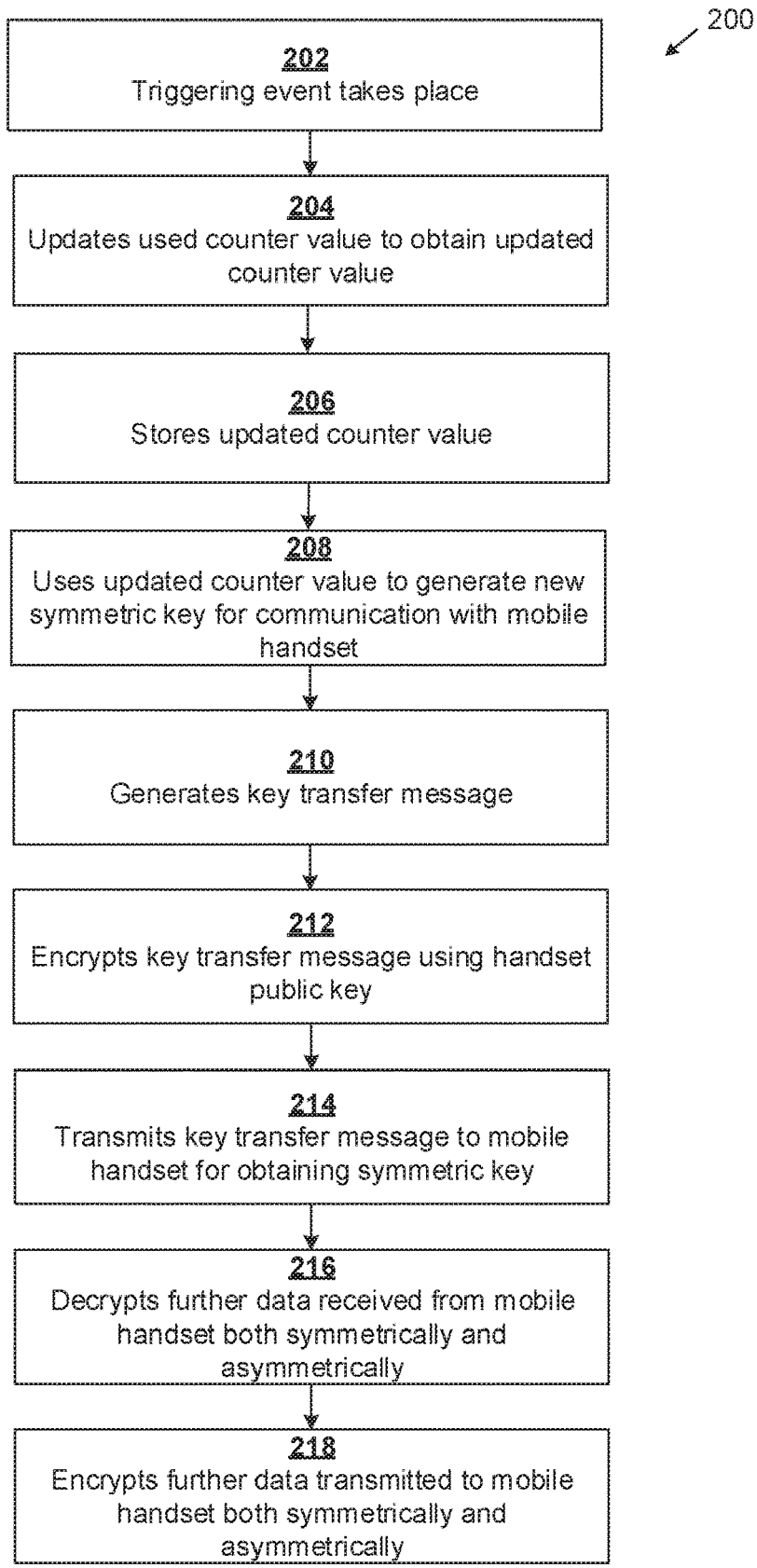
FIG. 2 is a flow diagram illustrating a method of establishing a secure communication channel according to embodiments described herein.

The flow diagram (200) of FIG. 2 illustrates an exemplary method of establishing a secure communication channel conducted at the remotely accessible server (110).

At a first stage (202), and typically during or after one or more handshake steps such as the certificate exchange described above, a triggering event takes place. The triggering event may be either a mobile handset initiation event or a server initiation event.

In this embodiment, the triggering event is an asymmetric cryptographic operation performed on data communicated between the remotely accessible server (110) and the mobile handset (120). In other words, the mobile handset initiation event may for example occur when the remotely accessible server (110) receives a communication from the mobile handset (120) which is encrypted asymmetrically using the server public key (183), or when it receives a communication from the mobile handset (120) which is digitally signed using the handset private key (172), and the server initiation event may for example occur when the remotely accessible server (110) transmits a communication to the mobile handset (120) that is encrypted using the handset public key (173). The remotely accessible server (110) may be notified of the triggering event at its triggering component (113B).

The triggering event is not limited to asymmetric cryptographic operations. The triggering event may include the one or more handshake steps between the remotely accessible server (110) and the mobile handset (120). It may also be any communication transmitted from the mobile handset (120) to the remotely accessible server (110), or from the remotely accessible server (110) to the mobile handset (120). In some embodiments, the triggering event occurs when a communication transmitted from the mobile handset (120) to the remotely accessible server (110), or from the remotely accessible server (110) to the mobile handset (120), is encrypted using a previously used symmetric key calculated using a used counter value, as will be described in more detail below.

In some embodiments, the triggering event is the commencement of a new communication session between the mobile handset (120) and the remotely accessible server (110). The triggering event may also include a plurality or combination of the above.

The one or more handshake steps mentioned above may typically include the certificate exchange process. The remotely accessible server (110) therefore receives the digital user certificate (170) from the mobile handset using the server software application installed on the remotely accessible server (110) and validates the digital user certificate by utilizing functionality provided by the encryption module distributed by the certificate authority. The handset validation component (119) of the remotely accessible server (110) may be used for validating the digital user certificate (170). The encryption module provided by the certificate authority may be included in the handset validation component (119).

The remotely accessible server (110) also transmits the digital server certificate (180) to the mobile handset (120) for validation of the remotely accessible server (110), validation being conducted using the handset software application (140) installed on the mobile handset utilizing functionality provided by the encryption module provided by the certificate authority. The server validation component (146)

may typically be used for validating the digital server certificate (180). The encryption module provided by the certificate authority may be included in the server validation component (146). Successful validation may, in some embodiments, be a triggering event.

The triggering event triggers the counter value to be updated. At a next stage (204), the remotely accessible server (110) then deterministically updates a used counter value to obtain an updated counter value. The used counter value was used to generate a previously used symmetric key for encrypting communications between the remotely accessible server (110) and the mobile handset (120). In this embodiment, the used counter value was used together with the static seed value to generate the previously used symmetric key. It should be appreciated that "deterministic" updating refers to updating the used counter value in any non-random manner, typically by way of incrementing the used counter value. The used counter value may be updated at the counter updating component (112).

At a next stage (206), the updated counter value is stored using the storing component (114). The updated counter value may be stored in the database (160) such that it is associated with the mobile handset (120) and/or the user (130). The remotely accessible server (110) then, at a next stage (208), uses the updated counter value to generate a new symmetric key (190) for communication with the mobile handset (120). The symmetric key (190) may be generated at the key generating component (115).

In this embodiment, the updated counter value is used together with the static seed value in a one-time password algorithm in order to generate the new symmetric key (190). An exemplary one-time password algorithm is Initiative For Open Authentication (OATH) HOTP. The counter value is, in such a case, used as the counter in the algorithm, while the static seed value is used as the key.

Both the seed value and counter value are known only to the remotely accessible server (110), and are therefore unknown to the mobile handset (120) and are never transmitted to the handset (120). Any other suitable algorithm may be used to generate the symmetric key, wherein at least a counter value of the algorithm is known only to the remotely accessible server (110) and not at the handset (120).

The static seed value typically remains the same for a particular handset. If communications are handset-initiated, the seed may start off having a "NULL" value. This means that no symmetric encryption or decryption is performed the first time the mobile handset communicates with the server. If communications are server-initiated, the seed may already have a value such that a symmetric key is calculated and included in the first asymmetrically encrypted payload transmitted to the mobile handset.

At a next stage (210), the remotely accessible server (110) generates a key transfer message at its message generating component (116), the key transfer message including the symmetric key (190) generated using the updated counter value. The key transfer message is then asymmetrically encrypted at a next stage (212), using the handset public key (173).

In the case where updating of the used counter value is triggered by a mobile handset initiation event such as the mobile handset (120) initiating a new communication session, the key transfer message is typically sent as an acknowledgement message to the mobile handset (120) in response to the mobile handset initiation event. In the case where updating of the used counter value is triggered by a server initiation event, the key transfer message may be transmitted to the mobile handset (120) as part of any asymmetrically encrypted payload to ensure that the mobile handset (120) receives the symmetric key (190) for use in subsequent communications.

The remotely accessible server (110) then, at a next stage (214), uses its data transmitting component (117) to transmit the key transfer message to the mobile handset (120) such that the mobile handset (120) is capable of using the handset private key (172) corresponding to the handset public key (173) to decrypt the key transfer message and obtain the symmetric key (190), typically using the cryptographic component (148) of its handset software application (140).

Once the mobile handset (120) has obtained the symmetric key (190), at a next stage (216), a secure communication channel (190) is established wherein data transmitted to the remotely accessible server (110), and typically received at its data receiving component (118), is decrypted both symmetrically by using the symmetric key (190) and asymmetrically using the server private key (182).

Similarly, at a next stage (218), data transmitted over the secure communication channel (190) to the mobile handset (120) is then encrypted both symmetrically by using the symmetric key (190) and asymmetrically using the handset public key (183).

The symmetric key (190) is used for encryption until a further triggering event takes place, which again causes the counter value to be updated and a new symmetric key to be calculated, which is to be communicated to the mobile handset (120) as described above. In this embodiment, the symmetric key used is dynamic in that any cryptographic operation performed on data transmitted between the remotely accessible server (110) and the mobile handset (120) causes the symmetric key to be updated.

Figure 3:
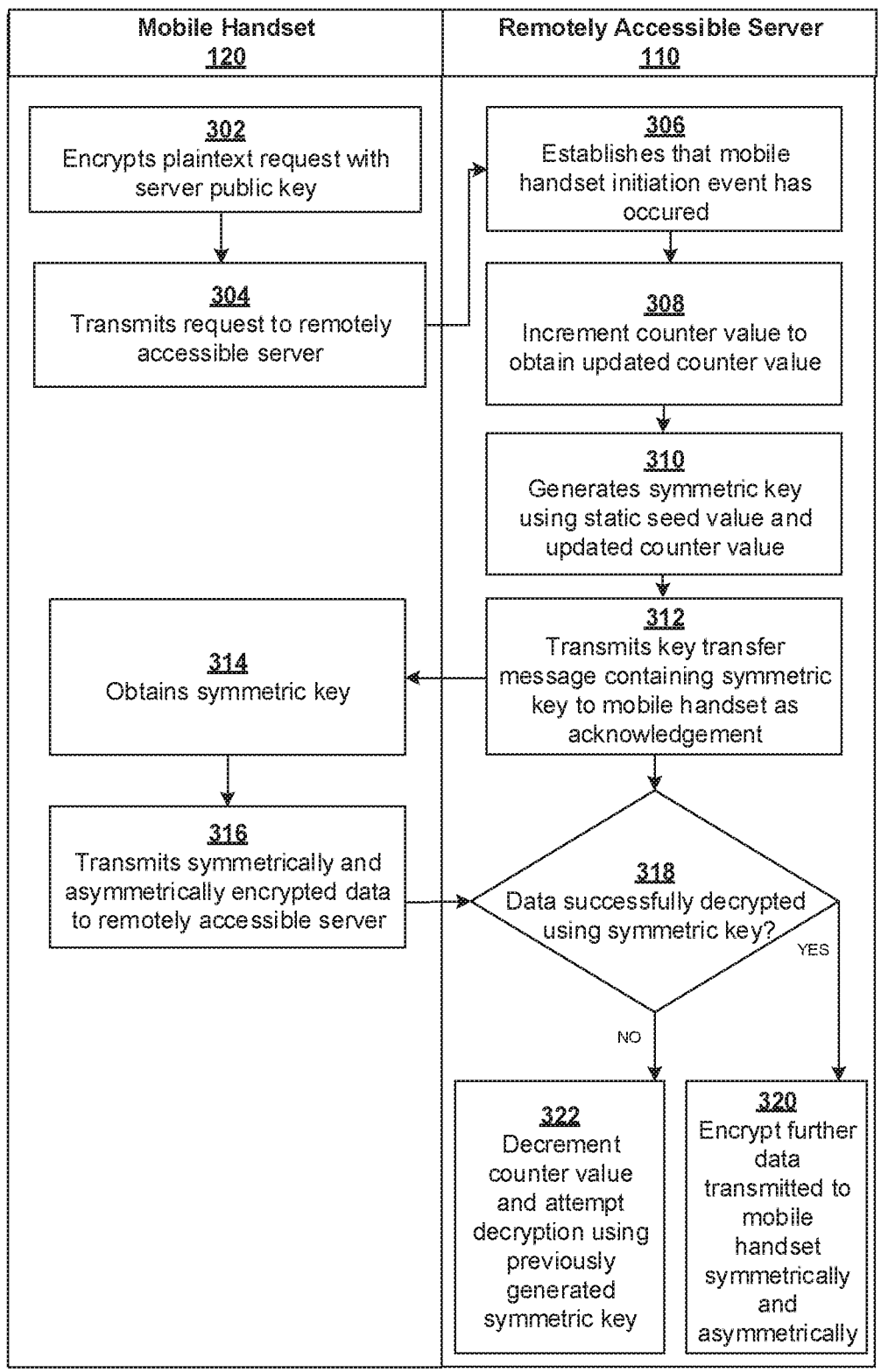
FIG. 3 is a swim-lane flow diagram illustrating a method of establishing a secure communication channel according to embodiments described herein.

In the example illustrated by the swim-lane flow diagram (300) of FIG. 3, the mobile handset (120) initiates communication with the remotely accessible server (110).

At a first stage (302), the mobile handset (120) generates a plaintext request, for example a transaction request relating to a financial transaction or access to a financial account, and asymmetrically encrypts it using the server public key (183). This request is then transmitted to the remotely accessible server (110) over the channel (150) shown in FIG. 1, at a next stage (304). This may be preceded by the handshake steps described above in order for the server (110) and handset (120) to ensure they are communicating with the correct party.

The remotely accessible server (110), at a next stage (110), receives the request and determines that a mobile handset initiation event has occurred as a result of the asymmetric cryptographic operation performed by the mobile handset (120). In other embodiments, the mobile handset initiation event may, for example, be defined as the commencement of a new communication session between the parties.

At a next stage (308), the counter value is incremented to yield an updated counter value. It should be appreciated that updating of the counter value can also be triggered by the communication of data which is both symmetrically and asymmetrically encrypted, as the asymmetric encryption will prompt the remotely accessible server (110) to generate a new symmetric key for further symmetric encryption. Furthermore, updating of the counter value can be triggered by a digital signing operation performed by the mobile handset (120). The secure communication channel may also be used to securely transmit such signatures.

At a next stage (310), a new symmetric key is generated, preferably using the static seed value and updated counter value in a HMAC-based one-time password algorithm such as OATH HOTP or another one-time password algorithm. The remotely accessible server (110) then, at a next stage (312) transmits a key transfer message to the mobile handset (140), which it can receive at its data receiving component (142) and asymmetrically decrypt to obtain the generated symmetric key.

The mobile handset (140) can then, instead of only encrypting plaintext with the server public key (183), first encrypt the plaintext using the symmetric key in a symmetric algorithm such as Advanced Encryption Standard (AES)-128, and then further encrypt the symmetrically encrypted plaintext asymmetrically using the server public key (183) to yield the final cipher text. The cipher text is transmitted to the remotely accessible server (110) at a next stage (316).

At a next stage (318), the remotely accessible server (110) is thus required to first asymmetrically decrypt and then symmetrically decrypt the cipher text received from the mobile handset (120). If encryption is successful, the remotely accessible server (110) proceeds as described above and typically also encrypts at least some further data it transmits to the mobile handset (140), firstly using the symmetric key, and also asymmetrically using the handset public key (173).

The remotely accessible server (110) may typically make use of one or more hardware security modules to perform asymmetric cryptographic operations. In such cases, data may simply be run through a symmetrical cipher before or after it is run through a hardware security module to enable successful cryptographic operations thereon.

The server (110) is configured to, if symmetric decryption of further data using the symmetric key is unsuccessful, at a next stage (322) attempt to decrypt the further data using the previously used symmetric key generated using the used counter value instead of using the symmetric key generated using the updated counter value, thereby accounting for the possibility of the key transfer message not being successfully transmitted to or obtained at the mobile handset. This may be the case when, for example, a packet of data containing the latest symmetric key did not successfully reach the mobile handset (120) over a particular wireless network.

In the case where updating of the counter value involves incrementing it, the server (110) will simply appropriately decrement the counter value and may also store the obtained counter value instead of the updated counter value.

It should be appreciated that although the system provided is described as including one remotely accessible server and one mobile handset, it is described as such primarily for illustrative purpose. The system may include a plurality of users each having a mobile handset in communication with the remotely accessible server. Each handset and/or user may then have a specific static seed value and/or counter value associated therewith at any given time, which is updated and stored by the server as herein described. There may also be a number of remotely accessible servers performing the functions described above. The system and method described herein may therefore enable multiple, distinct secure communication channels to be established between the server or servers and mobile handsets of users at any given time.

The term "handset software application" is not limited to a mobile software application and may include applications provided by a software development kit (SDK).

It is foreseeable that the certificate authority may periodically issue new certificates to all the handsets and/or servers to which it has previously issued certificates. This may be done as frequently as required, but preferably on an annual basis. The issuing of new user certificates may then also include the calculation and issuing of new user private/public key pairs in cases where the certificate authority calculated these on behalf of the mobile handset.

The above description is by way of example only and it will be appreciated that numerous modifications may be made to the embodiments described without departing from the scope of the disclosure. In particular, the system architecture, method steps and data flow as described may be conducted in any number of different ways and in any workable order.

The system and method described herein may provide a way of establishing a secure communication channel between a mobile handset, in particular a mobile phone, and a remotely accessible server such as an online application server, by ensuring that sensitive data such as data relating to financial transactions or access to a financial account is transmitted over a channel which is both symmetrically and asymmetrically encrypted.

The described system and method may provide a secure way of transacting from mobile phones with online application servers, thus making it possible and safe for service providers, such as banks, to allow the use of the full functionality of their online services from mobile phones and other mobile handsets.

The described system and method may provide a handset software application configured to be installed on a mobile handset to receive a key transfer message and asymmetrically decrypt the key transfer message to obtain a symmetric key therefrom. This symmetric key is dynamic and changes each time a triggering event takes place.

A new symmetric key may therefore be calculated at the server for each new communication session or may change during a communication session, for example as a result of asymmetric encryption as described, without the mobile handset being exposed to the values used to calculate the symmetric key. In this way, even if a miscreant intercepts one such symmetric key, it may have already become unusable or may only be of use for a short period of time.

It is envisaged that, if the remotely accessible server establishes that a communicating party is attempting to reuse an old or previously used symmetric key, the remotely accessible server may block communications from a mobile handset of that party or otherwise restrict the communicating party from accessing an application or portal. The remotely accessible server may, for example, block or revoke a digital certificate associated with such a party or the mobile handset of the party.

The server may thus, in response to determining that the previously used symmetric key or a symmetric key used or generated prior to the previously used symmetric key was used to encrypt data received from the mobile handset instead of using the symmetric key generated using the updated counter value, associate the mobile handset with a potential security threat. Any suitable action may be taken before blocking or restricting the mobile handset or user associated with the potential security threat. The user may, for example, be required to enter a passcode or perform some form of out-of-band authentication. If authentication succeeds, the server may accept that there is no security threat and that the key transfer message containing the most recent symmetric key was simply not successfully transmitted to or obtained at the mobile handset, and may allow communications to continue normally.

It is also envisaged that the remotely accessible server or the entity controlling the remotely accessible server may not only store details such as the handset public key and the current or latest symmetric key, but also maintain a record of a plurality of previously used symmetric keys. For example, all of the symmetric keys generated and/or used over a period of one year in relation to a particular user or mobile handset may be stored by the remotely accessible server or the controlling entity.

Maintaining such records enables previous communications between a mobile handset and the remotely accessible server to be decrypted if necessary. This may be required, for example, by financial, banking or other security regulations. It should be appreciated that the actual symmetric keys themselves may not need to be stored, as the counter value may simply be reduced in order to recalculate previously used symmetric keys.

Whereas known methods of generating symmetric keys may involve both the mobile handset and the remotely accessible server being required to possess a seed value and/or a counter value at some stage, the described system and method may permit these values to be known only at the server, thereby possibly further reducing the risk that these values may be obtained and fraudulently used.

It should be appreciated that the disclosure extends to a computer program product for establishing a secure communication channel between a mobile handset and a remotely accessible server, the computer program product comprising a computer-readable medium having stored computer-readable program code for performing the steps of: deterministically updating a used counter value to yield an updated counter value, the used counter value having been used to generate a previously used symmetric key for encrypting communications between the remotely accessible server and the mobile handset; storing the updated counter value; using the updated counter value to generate a symmetric key; generating a key transfer message including the symmetric key generated using the updated counter value; asymmetrically encrypting the key transfer message using a handset public key associated with the mobile handset; transmitting the key transfer message to the mobile handset such that the mobile handset is capable of using a handset private key corresponding to the handset public key to decrypt the key transfer message and obtain the symmetric key; decrypting further data received from the mobile handset asymmetrically using a server private key associated with the remotely accessible server and symmetrically using the symmetric key; and encrypting further data communicated to the mobile handset symmetrically using the symmetric key and asymmetrically using the handset public key. The computer-readable medium may be a non-transitory computer-readable medium, the computer-readable program code being executable by a processing circuit.

As described above, a digital certificate exchange may be performed during or for the purpose of establishing a secure communication channel between the mobile handset and the remotely accessible server. The digital certificates are exchanged by the mobile handset and remotely accessible server so that each of these devices may prove its identity to the other. The remotely accessible server, for example, validates the digital user certificate by utilizing functionality provided by the encryption module distributed by the certificate authority.

The certificate exchange and validation process may indicate to the parties that they are talking to the intended recipients and after the certificate exchange, the mobile handset will be in possession of the server public key and the remotely accessible server will be in possession of the handset public key.

As described above, the digital user certificate may have an identifier stored therewith which may be uniquely linked in a record maintained in the database to the mobile handset and/or a registered user (or client) associated with the mobile handset. The remotely accessible server may use the identifier and/or the digital user certificate to identify registered users and to determine whether communications with a handset presenting the identifier and/or digital user certificate should be continued.

Although measures may be taken to prevent compromise of the digital user certificate (or other appropriate unique device identifier), it is possible that a compromise may occur.

Figure 4A:
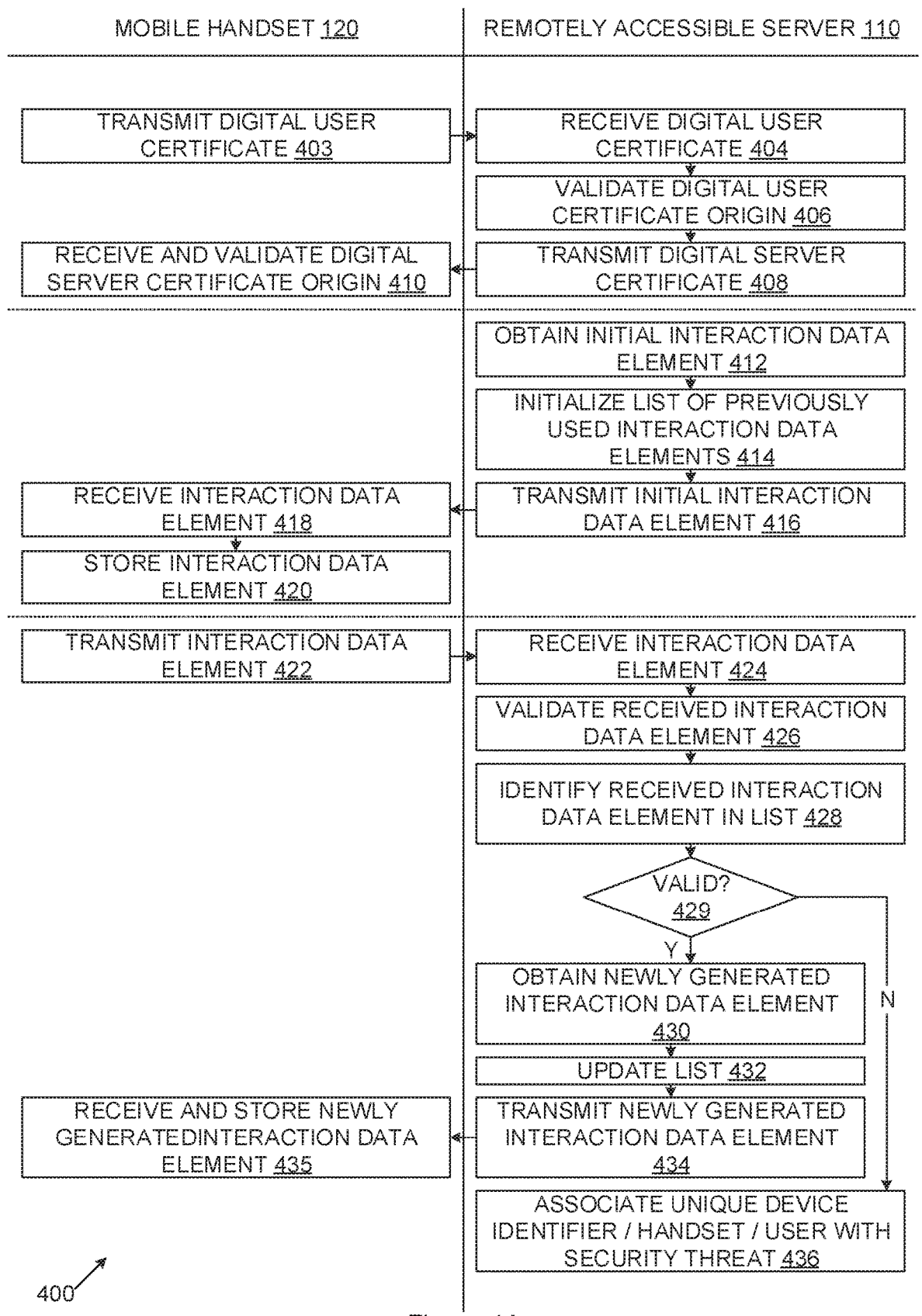
FIG. 4A is a swim-lane flow diagram which illustrates an exemplary method for determining a compromise risk associated with a unique device identifier according to embodiments described herein.

FIG. 4A is a swim-lane flow diagram which illustrates an exemplary method (400) for determining a compromise risk associated with a unique device identifier in which respective swim-lanes delineate functions, operations, steps, etc. performed by the respective devices.

The unique device identifier may include one or more of the user digital certificate, the identifier included in the user digital certificate or any other appropriate identifier created by or on behalf of the handset and which is configured to uniquely identify the handset to the remotely accessible server.

The method (400) may be conducted as a part of or subsequent to establishing a secure communication channel between a mobile handset (120) and a remotely accessible server (110). During establishment of the secure communication channel, the handset (120) may provide a unique device identifier to the server (110) to assert registration with the server (110) and/or an association with a registered user. By providing the unique device identifier, the mobile handset (120) asserts that it has a certain identity and that it is authorized to perform certain operations in association with the asserted identity.

In some implementations, the unique device identifier is a digital user certificate. Establishing a secure communication channel may include the handset transmitting (403) and the server (110) receiving (404) a digital user certificate and optionally a signed or encrypted challenge. The server (110) may use a server software application installed on the remotely accessible server (110) and may validate (406) the origin of the digital user certificate. Validating (406) the origin of the digital user certificate may include decrypting the challenge received from and encrypted by the handset (120). The handset (120) may have encrypted the challenge-response using the handset private key (which may be secure stored by and known only to the handset) and the server (110) may use the handset public key to decrypt the challenge-response. The server (110) may obtain the handset public key from the certificate received from the handset (120). As described above, the digital user certificate may have been issued to the mobile handset by the certificate authority and may include an identifier uniquely associated with the mobile handset and/or a registered user in addition to the handset public key.

The remotely accessible server (110) may transmit (408) a digital server certificate to the mobile handset (120) and optionally a signed or encrypted challenge. The mobile handset may receive the digital server certificate (and signed/encrypted challenge) and validate (410) the origin of the digital server certificate. Validation (410) of the origin of the digital server certificate include may include decrypting the challenge received from and encrypted by the server (110). The server (110) may have encrypted the challenge-response using the server private key and the handset (120) may use the server public key to decrypt the challenge-response. The handset (120) may obtain the server public key from the certificate received from the server (120). As described above, the digital server certificate may have been issued to the remotely accessible server (110) by the certificate authority and may include the server public key corresponding to the server private key.

The asymmetric encryption keys (the public keys of the server and handset respectively) may be used to encrypt subsequent communications between the server (110) and handset (120). In some implementations, a symmetric key may be shared between the server (110) and the handset (120) as a part of establishing the secure communication channel (which key may be used to encrypt subsequent communications via and as a part of the secure communication channel). In other implementations, a Diffie-Hellman key exchange or other appropriate key exchange may be performed as a part of establishing and/or communicating via the secure communication channel.

In the case of the establishment of a secure communication channel between the server (110) and handset (120) for the first time (e.g. after the user registers with the system for the first time), an initialization, or bootstrapping, process may commence. This may include the server (110) obtaining (412) an initial interaction data element.

In some implementations, the interaction data element may be deterministic. Obtaining (412) the interaction data element may include using a static seed value, a counter value and an algorithm. In the initialization process one or both of the seed value and counter value may be initialized and uniquely associated with the unique device identifier (e.g. by storing the values in the database in association a user record). Any suitable algorithm may be used to reliably generate the same output for the same input. In some implementations, the above-described HOTP algorithm may be used.

In other implementations, the interaction data element may be a random number. Obtaining (412) the interaction data element may include collecting randomness from one or more hardware sources associated with server (110) for use in generating an interaction data element. In some cases, obtaining (412) the interaction data element may use a hardware security module associated with the server (110). In some implementations the interaction data element may be a nonce.

The server (110) may initialize (414) a list including a subset of previously used interaction data elements including the initial interaction data element. The list may for example be file including a list of previously obtained and/or used interaction data elements. Upon initialization, the list may include only the initial interaction data element. In some cases, the list may implement first-in first-out rules whereby a predetermined number of interaction identifiers may be stored. In some implementations, the subset may include the two most recently used interaction data elements. In some cases, the list may store more than the two most recently used interaction data elements, e.g. the list may be sufficient to store one, two, three, etc. years' worth of interaction data elements. The list may be associated with the unique device identifier (e.g. stored in the database in association with the user record).

The server (110) may transmit (416) the initial interaction data element to the mobile handset (120) for subsequent presentation by the handset (120) to the server (110). Transmitting (416) the initial interaction data element may include encrypting the interaction data element using the public key associated with the mobile handset and transmitting the encrypted interaction data element to the mobile handset. The interaction data element may be transmitted via the secure communication channel.

The handset (120) may receive (418) the interaction data element from the server (110). In some cases, the interaction data element may be encrypted and the mobile handset may decrypt it (e.g. using its private key) and may be received via the secure communication channel. The handset (120) may transmit an acknowledgement to the server (110) in response to receiving the interaction data element.

In some implementations, the handset (120) may store (420) the interaction data element for subsequent use. In some cases, the interaction data element may be a single-use interaction data element and subsequent use may be the next time the handset transmits a data message to the remotely accessible server. In other cases, the interaction data element may be configured for multiple uses and/or may have a time to live associated therewith. In some cases, the interaction data element may be stored for presentation by the handset (120) to the server (110) as a part of or subsequent to establishing another secure communication channel (e.g. when the handset next interacts with the server, the next day, week etc.). Storage for subsequent use may therefore include storage for subsequent use during a given session, for use in the next session, for use over multiple sessions, and the like.

Subsequently, and in accordance with rules defined for use of the interaction data element (e.g. subsequent to or as a part of establishing a secure communication channel at another point in time) the handset (120) may transmit (422) the interaction data element to the server (110).

The interaction identifier may be transmitted responsive to or as a part of establishing a subsequent secure communication channel. In some implementations, the handset (120) may be configured to autonomously transmit (422) the interaction data element to the server (110) without the server prompting. In some implementations, transmitting (422) the interaction data element may include using the stored interaction data element to sign a challenge sent by the server (110), the signed challenge being returned to the server for verification (e.g. a "challenge-response"). In some cases, the interaction data element may be used by the handset (120) as a symmetric key to symmetrically encrypt data which is subsequently transmitted to the server (110). In some implementations, the interaction data element may be encrypted using the server public key. In some implementations, transmitting the interaction data element may include using the interaction data element as a session key.

The server (110) may receive (424) the interaction data element from the handset (120). The interaction data element may be received in response to or as a part of establishment of a secure communication channel between the mobile handset and the remotely accessible server. The interaction data element may be received via the secure communication channel.

In some implementations, receiving (424) the interaction data element may include receiving the interaction data element in the form of a challenge-response in which a challenge transmitted to the handset (120) is received from the handset in the form of a response including the challenge having been signed at the mobile handset using the interaction data element. In some cases, receiving (424) the interaction data element may include receiving data having been symmetrically encrypted by the mobile handset using the interaction data element as a symmetric encryption key.

The server (110) may validate (426) the received interaction data element against the record associated with the unique device identifier. Validating (426) the interaction data element may include identifying (428) the received interaction data element in the list of previously used interaction data elements. This may for example include searching the list for an interaction data element that matches the received interaction data element. In some implementations, the most recently used interaction data element stored in the list is compared against the received interaction data element. If that fails, a next most recently used interaction data element stored in the list may be compared against the received interaction data element.

In some implementations, validating (426) the interaction data element may include validating a challenge-response having been signed using the interaction data element. In some cases, validating (426) the interaction data element may include decrypting data having been symmetrically encrypted using the interaction data element stored in the list of interaction data elements. This may for example use the most recently used (or stored) interaction data element to decrypt received data.

Validating (426) the received interaction data element may determine that an interaction data element is invalid if: the received interaction data element cannot be located in the list; if the challenge-response validation fails; if an interaction data element other than the most recently used interaction data element or a predetermined sequence of interaction data elements used prior to the most recently used interaction data element was used to encrypt data received from the mobile handset; etc. The predetermined number may for example be the two, three, four, five, etc. most recently used interaction data elements. Thus, if an interaction data element is received that is too old (e.g. too far down the sequence), the interaction data element may be determined to be invalid.

In some implementations, only the most recently used interaction data element is stored in the list (and in some cases an interaction data element used prior to that, e.g. if an acknowledgement was not received). Thus, validating the interaction data element may include simply identifying the received interaction data element in the list.

If (429) the received interaction data element is valid the server (110) may continue to communicate with the handset (120) as normal.

If valid (and in some cases additionally upon the occurrence of a triggering event (e.g. as described above), according to an update schedule, etc. or otherwise simply in response to successful validation) the server (110) may obtain (430) a newly generated interaction data element. This may use similar techniques described above with reference to the initial interaction data element. The server (110) may update (432) the list of previously used interaction data elements to include the newly generated interaction data element (e.g. by updating a file to include the newly generated interaction data element).

In some implementations, updating (432) the list of previously used interaction data elements may include removing one or more previously used interaction data elements from the list. In cases where only one or two of the most recently used interaction data elements are stored in the list, updating the list may remove the older of the two most recently used interaction data elements before updating the list to include the newly generated interaction data element. In some cases, removal of one or more previously used interaction data elements from the list may be contingent upon the server receiving an acknowledgement from the handset that the newly generated interaction data element has been received.

The server (110) may transmit (434) the newly generated interaction data element to the handset (120) for subsequent presentation to the server (110) (in accordance with the rules defined for use of the interaction data elements—e.g. upon or as apart of establishing a later secure communication channel with the server). In some cases, the server (110) may encrypt the newly generated interaction data element using a public key associated with the mobile handset and transmit the encrypted interaction data element to the mobile handset.

Obtaining and transmitting a newly generated interaction data element to the mobile handset may be performed each time a secure communication channel is established, provided that the interaction data element provided by the handset to the server is valid.

The handset (120) may receive and store (435) the newly generated interaction data element for subsequent presentation to the server (110). The newly generated interaction data element may for example be transmitted to the server (110) the next time the handset (110) interacts with the server (110) (e.g. subsequent to or as a part of establishing a secure communication channel with the server at a later point in time). In some cases, the handset (120) may transmit an acknowledgement to the server (110) in response to receiving the newly generated interaction data element.

If (429) the received interaction data element is not valid, the server (110) may associate (436) one or more of: the unique device identifier, handset (120) and registered user with a potential security threat. Associating (436) the unique device identifier with a potential security threat may include blacklisting the unique device identifier (e.g. by preventing further communications with any handsets that present the unique device identifier to the server in an attempt to assert an identity). In some cases, the unique device identifier may be revoked. In some implementations, associating (436) the unique device identifier with a potential security threat may include initiating an out of band authentication request to the registered user (e.g. initiating a call, sending an email or message to the registered user, requesting the user to visit a branch, answer security questions, etc.).

Depending on configuration, if the received interaction data element is not valid, the server (110) may either: permit communications with the mobile handset to continue, despite the association with a security threat; or, terminate communications with the mobile handset. If communications are continued, any messages, requests, data, etc. received from the handset may be marked as suspect on account of the security threat association.

The above described method may accordingly determine a compromise risk associated with a unique device identifier. The compromise risk may increase where communications from a handset presenting a given unique device identifier are accompanied by interaction data elements that are old or out of sequence. Receiving an old or out of sequence interaction data element may indicate that more than one handset is using the same unique device identifier, which is in turn indicative of a compromised unique device identifier. Upon determining a compromise risk (i.e. by detecting use of an old or out of use interaction data element) the unique device identifier may be associated with a security threat and the appropriate action may be taken to prevent any or further damage.

Figure 4B:
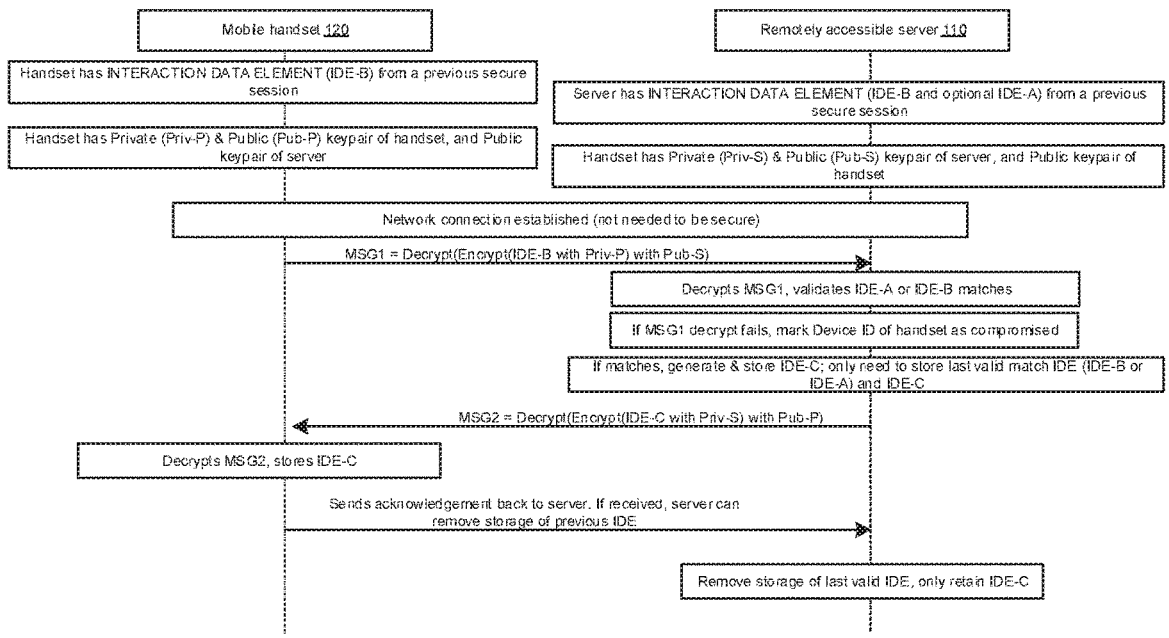
FIG. 4B is a swim-lane flow diagram which illustrates an example embodiment of a method for determining a compromise risk associated with a unique device identifier according to embodiments described herein.

FIG. 4B is a swim-lane flow diagram which illustrates an example of a method for determining a compromise risk associated with a unique device identifier according to embodiments described herein.

Initially, the handset (120) stores an interaction data element (IDE-B) which may have been received and stored in a previous secure session. The handset also stores a handset private (Priv-P) and public (Pub-P) keypair of the handset and the public keypair (Pub-S) of the server.

Similarly, the server (110) stores IDE-B and optionally IDE-A (e.g. stored in a list) from the previous session as well as the server private (Priv-S) and public (Pub-S) keypair and the handset public keypair (Pub-P). Storage of IDE-A, an interaction device identifier generated prior to IDE-B, may be due to an acknowledgement having not been received from the handset responsive to the server transmitting IDE-B.

A network connection may then be established between the handset (120) and the server (110). The network connection may be secure. The handset (120) generates a message (MSG1) by encrypting IDE-B with the handset private key (Priv-P) and decrypting the resulting cipher text with the server public key (Pub-S). The message (MSG1) is transmitted to the server via the network connection.

The server (110) receives the message (MSG1) and decrypts it to obtain IDE-B. This may include encrypting the message with the server private key (Prv-S) and decrypting the result using the handset public key (Pub-P). If the decryption operation fails, the server (110) may associate the handset with a security threat (e.g. mark it as compromised).

The server (110) validates IDE-A or IDE-B matches (as may be appropriate), e.g. by determining whether the received IDE matches the stored IDEs. An IDE-A match may occur if the handset never received IDE-B (and hence actually transmitted IDE-A.) If there is a match, the server (110) generates and stores IDE-C (i.e. a newly generated interaction data element). The server (110) generates a message (MSG2) for transmission to the handset (120) by encrypting IDE-C with the server private key (Prv-S) and decrypting the resultant cipher text using the handset public key (Pub-P). The message is transmitted to the handset (110) via the network connection.

The handset (120) receives the message (MSG2) and decrypts it to obtain the newly generated interaction data element (IDE-C). This may include encrypting the received message with the handset private key (Priv-P) and decrypting the result using the server public key (Pub-S). The handset (120) stores IDE-C and transmits an acknowledgement to the server (110).

If the server (110) receives the acknowledgement, the server (110) removes storage of the last valid IDE and retains only IDE-C. Otherwise, the server may retain the last valid IDE (i.e. IDE-A or IDE-B) as well as IDE-C.

Figure 5:
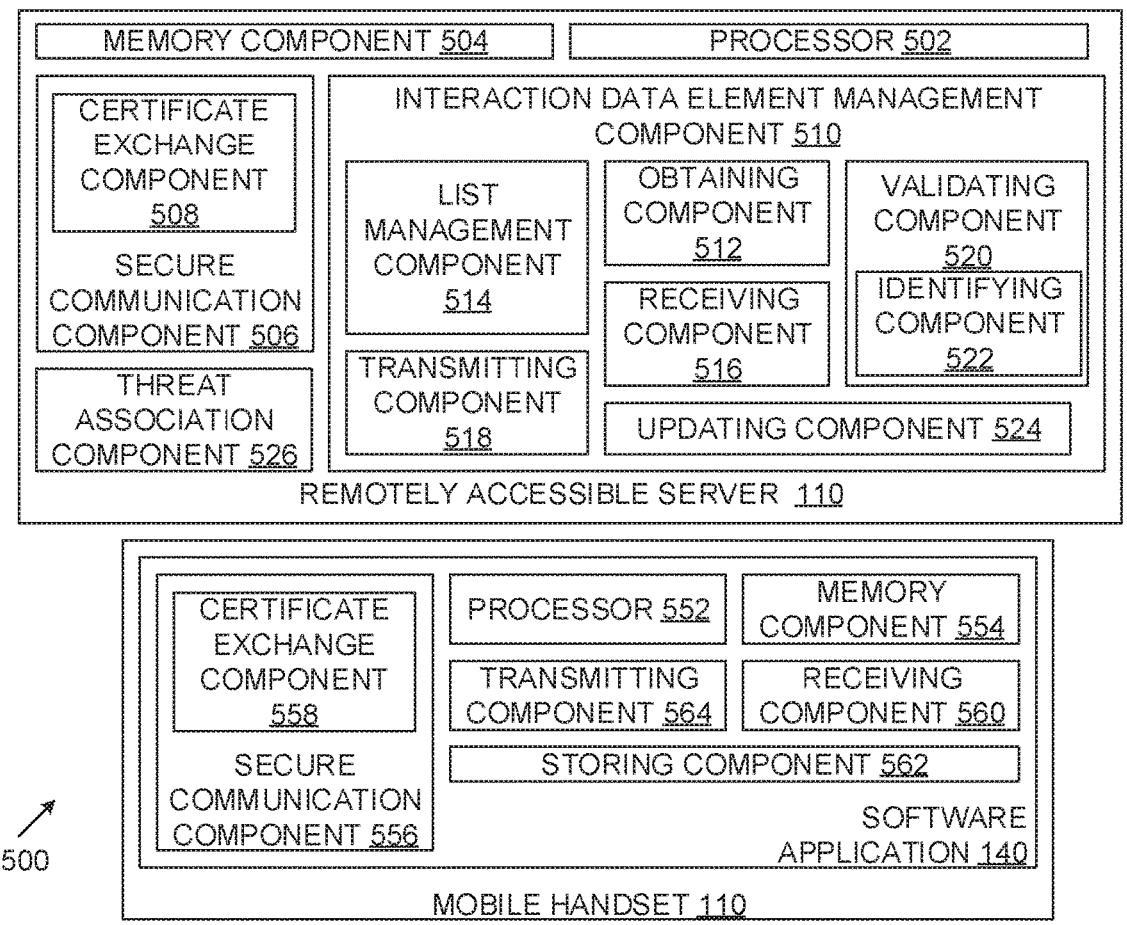
FIG. 5 is a block diagram which illustrates components of an exemplary system for determining a compromise risk associated with a unique device identifier according to embodiments described herein; and, FIG. 6 illustrates an example of a computing device in which various aspects of the disclosure may be implemented.

FIG. 5 is a block diagram which illustrates components of an exemplary system (500) for determining a compromise risk associated with a unique device identifier. The system includes the remotely accessible server (110) and the mobile handset (120). Any suitable combination of the components of the server (110) and handset (120) described with reference to FIG. 5 and the components described above with reference to FIGS. 1B and 1C may be used.

The server (110) may include a processor (502) for executing the functions of the described components, which may be provided by hardware or by software units executing on the server (110). The software units may be stored in a memory component (504) and instructions may be provided to the processor (502) to carry out the functionality of the described components.

The server (110) may include a secure communication component (506) configured to establish a secure communication channel with the handset (120). The secure communication component (506) may include a certificate exchange component (508) configured to exchange digital certificates with the handset (120) for establishing the secure communication channel.

The server (120) may include an interaction data element management component (510). The interaction data element management component (510) may include an interaction data element obtaining component (512) which may be configured to obtain an initial or newly generated interaction data element. The interaction data element obtaining component (512) may generate interaction data elements which may be deterministic or random. The interaction data elements may be obtained or generated using one or more of: a seed value, a counter value; an algorithm; randomness collected from hardware associated with the server (110); and a hardware security module.

The interaction data element management component (510) may include a list management component (514) configured to initialize and maintain (e.g. update) a list of previously used interaction data elements. The list may for example be a file and may include all or a subset of previously used or obtained interaction data elements. The list may be stored in a record in the database in association with a particular unique device identifier (e.g. in a user record associated with the handset (120) and unique device identifier).

The interaction data element management component (510) may include an interaction data element receiving component (516) and an interaction data element transmitting component (518) for respectively receiving and transmitting interaction data elements from and to the handset (120). The interaction data element transmitting component (518) may encrypt the interaction data elements prior to transmission and the interaction data element receiving component (516) may decrypt received interaction data elements. In some implementations the interaction data elements may be transmitted and received via a secure communication channel.

The interaction data element management component (510) may include an interaction data element validating component (520) arranged to validate received interaction data elements against the record associated with the unique device identifier. The interaction data element validating component may include an identifying component (522) configured to identify the received interaction data element in the list of previously used interaction data elements (e.g. by searching the file for a record of the received interaction data elements). The interaction data element validating component (520) may also perform other validation operations (e.g. a challenge-response validation, a decryption validation, etc.) in validating the received interaction data element. The interaction data element validating component (520) may determine the received interaction data element not to be valid if the received interaction data element is not in the list of previously used interaction data elements.

The interaction data element management component (510) may also include an interaction data element updating component (524). The interaction data element updating component (524) may use the interaction data element obtaining component (512) to obtain a newly generated interaction data element and may use the list management component (514) to update the list to include the newly generated interaction data element. The interaction data element transmitting component (518) may be used to transmit the interaction date element to the handset (120) for subsequent presentation to the server (110).

The server (110) may include a threat association component (526) arranged to, if the received interaction data element is not valid, associate the unique device identifier with a potential security threat.

The handset (120) may include a processor (552) for executing the functions of the described components, which may be provided by hardware or by software units executing on the handset (120). The software units may be stored in a memory component (554) and instructions may be provided to the processor (552) to carry out the functionality of the described components. Some or all of the components may be provided by the handset software application (140) downloadable onto and executable on the handset (120).

The handset (120) may include a secure communication component (556) configured to establish a secure communication channel with the server (110). The secure communication component (556) may include a certificate exchange component (558) configured to exchange digital certificates with the server (110) for establishing the secure communication channel.

The handset (120) may include an interaction data element receiving component (560) configured to receive an initial or newly generated interaction data element from the server (110). As mentioned, the interaction data element may be received in encrypted form and may be decrypted using the handset private key. The interaction data element may be received via the secure communication channel.

The handset may include an interaction data element storing component (562) configured to store the received interaction data element. The storing component (562) may store the received interaction data element in a secure location on the handset (e.g. within a restricted portion of memory, in a secure element, etc.). The storing component (562) may store the received interaction data element for subsequent presentation to the server (110). It should be appreciated that the storing component (562) may overwrite a previously stored interaction data element with a newly generated interaction data element received from the server (110). Thus, the stored interaction data element may be updated upon the server's determination (e.g. in response to a triggering event, update schedule, etc.).

The handset (120) may include an interaction data element transmitting component (564) arranged to transmit the stored interaction data element to the server (110). In some implementations, the transmitting component (564) may be configured to transmit the stored interaction data element to the server (110) autonomously in response to establishing a new secure communication channel with the server (110)—e.g. the next time the handset needs to interact with the server (110). Any given interaction data element may thus be stored for a number of hours, days, or weeks, depending on when the handset next needs to interact with the server (110) and in some implementations may be updated by the server just as soon as it is validated by the server. The transmitting component may be configured to use the interaction data element to sign a challenge sent by the server (110) (e.g. a challenge-response). In some implementations transmitting the interaction data element may include using the interaction data element to encrypt data and transmitting the encrypted data to the server (110) to decryption thereat.

Systems and methods described herein accordingly enable the detection of a compromise risk associated with a device identifier which is intended to be uniquely associated with a single mobile handset (and in some cases user) only. The compromise risk may be detected by virtue of conflicting, old or out of sequence interaction data elements being received from handsets providing the same unique device identifier. As the handsets are configured to provide a stored interaction data element to the server, which may be updated by the server from time to time or upon each successfully established secure communication channel, the interaction data elements of a legitimate handset and a compromised handset may become out of sync with each other (e.g. as one handset interacts with the server and the other does not). The out of sync interaction data elements may be detected by the server as a compromise risk and appropriate action may be taken.

Figure 6:
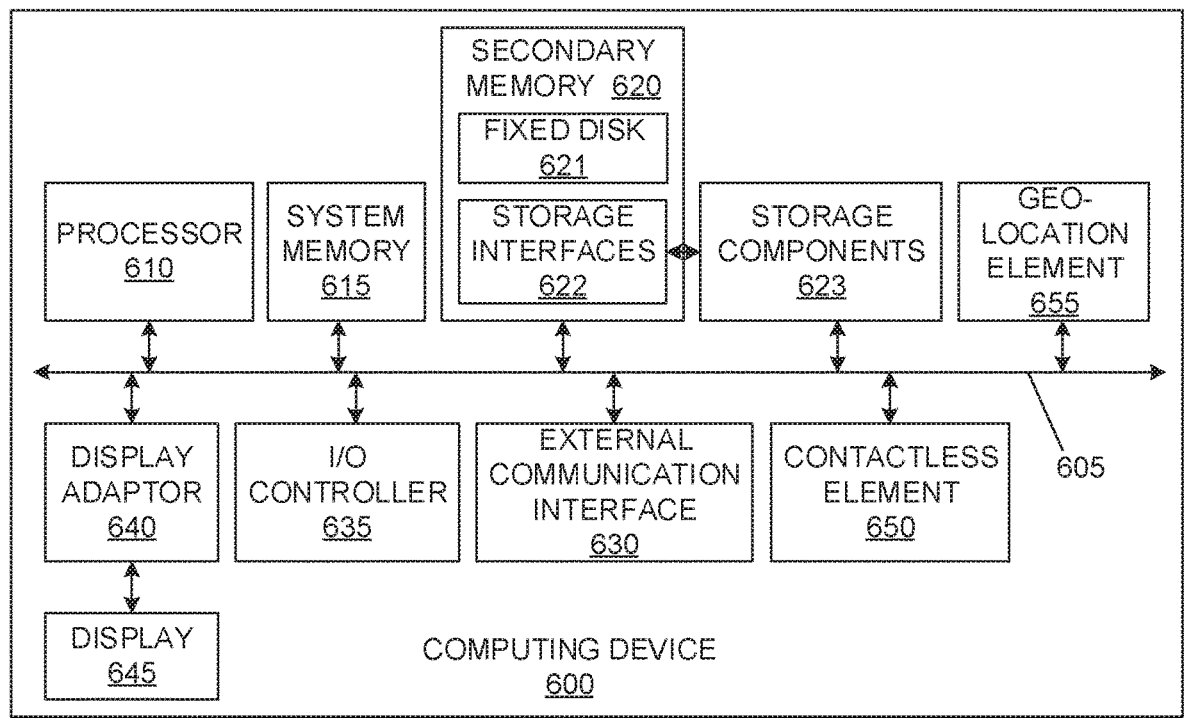

FIG. 6 illustrates an example of a computing device (600) in which various aspects of the disclosure may be implemented. The computing device (600) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (600) may be suitable for storing and executing computer program code. The various participants and elements in the previously described system diagrams may use any suitable number of subsystems or components of the computing device (600) to facilitate the functions described herein. The computing device (600) may include subsystems or components interconnected via a communication infrastructure (605) (for example, a communications bus, a network, etc.). The computing device (600) may include one or more processors (610) and at least one memory component in the form of computer-readable media. The one or more processors (610) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (600) may be distributed over a number of physical locations (e.g. in a distributed, cluster or cloud-based computing configuration) and appropriate software units may be arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software. The memory components may also include secondary memory (620). The secondary memory (620) may include a fixed disk (621), such as a hard disk drive, and, optionally, one or more storage interfaces (622) for interfacing with storage components (623), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (600) may include an external communications interface (630) for operation of the computing device (600) in a networked environment enabling transfer of data between multiple computing devices (600) and/or the Internet. Data transferred via the external communications interface (630) may be in the form of signals, which may be electronic, electromagnetic, optical, radio, or other types of signal. The external communications interface (630) may enable communication of data between the computing device (600) and other computing devices including servers and external storage facilities. Web services may be accessible by and/or from the computing device (600) via the communications interface (630).

The external communications interface (630) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuity. The external communications interface (630) may include a subscriber identity module (SIM) in the form of an integrated circuit that stores an international mobile subscriber identity and the related key used to identify and authenticate a subscriber using the computing device (600). One or more subscriber identity modules may be removable from or embedded in the computing device (600).

The external communications interface (630) may further include a contactless element (650), which is typically implemented in the form of a semiconductor chip (or other data storage element) with an associated wireless transfer element, such as an antenna. The contactless element (650) may be associated with (e.g., embedded within) the computing device (600) and data or control instructions transmitted via a cellular network may be applied to the contactless element (650) by means of a contactless element interface (not shown). The contactless element interface may function to permit the exchange of data and/or control instructions between computing device circuitry (and hence the cellular network) and the contactless element (650). The contactless element (650) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (600) and an interrogation device. Thus, the computing device (600) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (610). A computer program product may be provided by a non-transient computer-readable medium, or may be provided via a signal or other transient means via the communications interface (630).

Interconnection via the communication infrastructure (605) allows the one or more processors (610) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (600) either directly or via an I/O controller (635). One or more displays (645) (which may be touch-sensitive displays) may be coupled to or integrally formed with the computing device (600) via a display (645) or video adapter (640).

The computing device (600) may include a geographical location element (655) which is arranged to determine the geographical location of the computing device (600). The geographical location element (655) may for example be implemented by way of a global positioning system (GPS), or similar, receiver module. In some implementations the geographical location element (655) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (600). In some implementations, the geographical location element (655) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method conducted at a remotely accessible server comprising:
   receiving a unique device identifier from a computing device, wherein the unique device identifier is associated with a record and is usable in identifying the computing device;
   receiving an interaction data element from the computing device;
   validating the received interaction data element including confirming that the received interaction data element matches an expected interaction data element associated with the record; and,
   based on determining that the received interaction data element is not valid, updating the record to associate the unique device identifier with a potential security threat,
   wherein the interaction data element is updated periodically according to a sequence, and wherein the expected interaction data element changes based on the sequence.

2. The method as claimed in claim 1, wherein confirming that the received interaction data element matches an expected interaction data element includes identifying a matching interaction data element in a list of interaction data elements stored in association with the record.

3. The method as claimed in claim 1, wherein the record is accessible to the remotely accessible server, wherein the record comprises a subset of previously used interaction data elements, and wherein the interaction data element is updated periodically at the computing device according to a sequence maintained at the remotely accessible server.

4. The method as claimed in claim 1, wherein the method includes updating the interaction data element according to the sequence when the received interaction data element is valid, including:
   obtaining a newly generated interaction data element;
   updating a list of interaction data elements to include the newly generated interaction data element; and,
   transmitting the newly generated interaction data element to the computing device for subsequent presentation to the remotely accessible server.

5. The method as claimed in claim 4, wherein updating the list of interaction data elements includes removing one or more previously used interaction data elements from the list.

6. The method as claimed in claim 1, wherein the expected interaction data element changes based on an updated list of interaction data elements.

7. The method as claimed in claim 1, including an initialization process including:
   obtaining an initial interaction data element;
   initializing a list of previously used interaction data elements including the initial interaction data element; and,
   transmitting the initial interaction data element to the computing device for subsequent presentation to the remotely accessible server.

8. The method as claimed in claim 1, further comprising:
   permitting communications with the computing device to continue based on determining that the interaction data element is not valid; or,
   terminating communications with the computing device based on determining that the interaction data element is not valid.

9. The method as claimed in claim 1, wherein associating the unique device identifier with a potential security threat includes blacklisting the unique device identifier.

10. The method as claimed in claim 9, wherein blacklisting the unique device identifier prevents communications with any computing device that presents the unique device identifier to the remotely accessible server.

11. The method as claimed in claim 1, wherein associating the unique device identifier with a potential security threat includes initiating an out of band authentication request.

12. The method as claimed in claim 1, wherein the unique device identifier is a digital user certificate including an identifier which is uniquely associated with the computing device.

13. The method as claimed in claim 12, including:
   validating an origin of the digital user certificate, the digital user certificate having been issued to the computing device by a certificate authority and including a computing device public key and the identifier uniquely associated with the computing device; and
   transmitting a digital server certificate to the computing device for validation of the remotely accessible server, the digital server certificate having been issued to the remotely accessible server by the certificate authority and including a server public key corresponding to a server private key.

14. The method as claimed in claim 1, wherein the interaction data element is received as a part of or subsequent to establishment of a secure communication channel between the computing device and the remotely accessible server, and wherein the method includes transmitting a newly generated interaction data element to the computing device for storage and presentation to the remotely accessible server as a part of or subsequent to establishment of a subsequent secure communication channel.

15. The method as claimed in claim 1, wherein the interaction data element is received in response to establishment of a secure communication channel between the computing device and the remotely accessible server, wherein as a part of establishing the secure communication channel the computing device provides the unique device identifier to assert an association with a registered user, and wherein the interaction data element is transmitted and received via the secure communication channel.

16. The method as claimed in claim 1, wherein the interaction data element is received in the form of a challenge-response in which a challenge transmitted to the computing device is received from the computing device in the form of a response including the challenge having been signed at the computing device using the interaction data element, wherein validating the received interaction data element includes validating the challenge-response.

17. The method as claimed in claim 1, wherein receiving the interaction data element includes receiving data having been symmetrically encrypted by the computing device using the interaction data element as a symmetric encryption key, wherein validating the received interaction data element includes attempting to decrypt the symmetrically encrypted data using the expected interaction data element.

18. The method as claimed in claim 1, wherein web services are accessible by the computing device from the remotely accessible server via a communications interface.

19. A system including a remotely accessible server including memory for storing computer-readable program code and a processor for executing the computer-readable program code, the remotely accessible server comprising:
- a device identifier receiving component for receiving a unique device identifier from a computing device, wherein the unique device identifier is associated with a record and is usable in identifying the computing device;
- an interaction data element receiving component for receiving an interaction data element from the computing device;
- an interaction data element validating component for validating the received interaction data element including confirming that the received interaction data element matches an expected interaction data element associated with the record; and,
- a threat association component for, based on determining that the received interaction data element is not valid, updating the record to associate the unique device identifier with a potential security threat,
- wherein the interaction data element is updated periodically according to a sequence, and wherein the expected interaction data element changes based on the sequence.

20. A computer program product comprising a non-transitory computer-readable medium having stored computer-readable program code for performing the steps of:
- receiving a unique device identifier from a computing device, wherein the unique device identifier is associated with a record and is usable in identifying the computing device;
- receiving an interaction data element from the computing device;
- validating the received interaction data element including confirming that the received interaction data element matches an expected interaction data element associated with the record; and
- based on determining that the received interaction data element is not valid, updating the record to associate the unique device identifier with a potential security threat,
- wherein the interaction data element is updated periodically according to a sequence, and wherein the expected interaction data element changes based on the sequence.

* * * * *